United States Patent [19]

Ito

[11] 4,273,219
[45] Jun. 16, 1981

[54] FRICTION PAD OF DISC BRAKE

[75] Inventor: Hiroshi Ito, Kawasaki, Japan

[73] Assignee: Tokico Ltd., Kawasaki, Japan

[21] Appl. No.: 65,743

[22] Filed: Aug. 10, 1979

[30] Foreign Application Priority Data

Aug. 19, 1978 [JP] Japan .......................... 53/114007[U]

[51] Int. Cl.³ ............................................ F16D 69/02
[52] U.S. Cl. ................................. 188/256; 188/251 M
[58] Field of Search .............. 188/73.1, 250 E, 251 A, 188/251 M, 256

[56] References Cited

U.S. PATENT DOCUMENTS

| 1,239,448 | 9/1917 | Armbrust | 188/256 X |
| 3,478,849 | 11/1969 | Hahm | 188/251 M |
| 3,485,331 | 12/1969 | Volker et al. | 188/251 M X |
| 3,684,062 | 8/1972 | Johnson | 188/251 A X |

Primary Examiner—Duane A. Reger
Attorney, Agent, or Firm—Wenderoth, Lind & Ponack

[57] ABSTRACT

A friction pad for use in disc brakes and is formed of a sintered metal. A recess is formed in a surface of the friction pad which engages with a disc in applying the brake, and is embedded by a resin.

5 Claims, 4 Drawing Figures

FRICTION PAD OF DISC BRAKE

BACKGROUND OF THE INVENTION

This invention relates to a friction pad for use in disc brakes of a vehicle or the like.

Some prior art disc brakes utilize sintered metal as the material for the linings of friction pads. However, there are shortcomings in the use of such material, for example that only a portion of the surface thereof contacts a disc in the initial stage of usage so that the braking efficiency is relatively low.

In order to avoid the aforementioned shortcomings, it has been proposed to apply a coating of rubber or synthetic resin material to the surface of the friction pad. However, when the coating has worn, the frictional coefficient will sometimes decrease thereby decreasing the braking function.

It has also been proposed to provide an oxide layer on or adjacent to the working surface of the friction pad or the lining. However, for forming the oxide layer, the friction pad is baked at a high temperature such as 700° C. or the like, and such high temperature tends to lower the bonding strength between the lining and the backing plate of the friction pad, and it is difficult to control the thickness of the oxide layer. Thus there are shortcomings in that the quality of the friction pad is not reliable, and the amount of the wear will increase when the quality is degraded.

SUMMARY OF THE INVENTION

An object of the present invention is to avoid the above described shortcomings by providing at least one recess in the working surface of the friction pad which is formed of a sintered material, and the recess is filled with a resin material.

BRIEF DESCRIPTION OF THE DRAWINGS

Further objects and effects of the invention will now be described with reference to the drawings; in which.

DETAILED DESCRIPTION OF THE PREFERRED EMBODIMENTS

Figure 1:
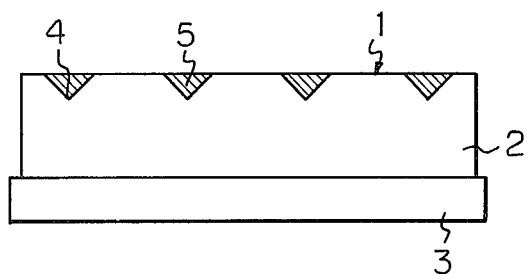
FIG. 1 is a sectional view showing one embodiment of the invention.
Figure 2:
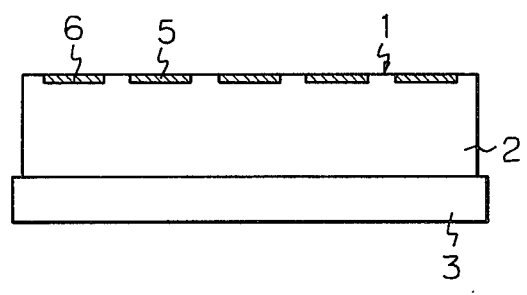
FIG. 2 is a sectional view showing another embodiment of the invention.
Figure 3:
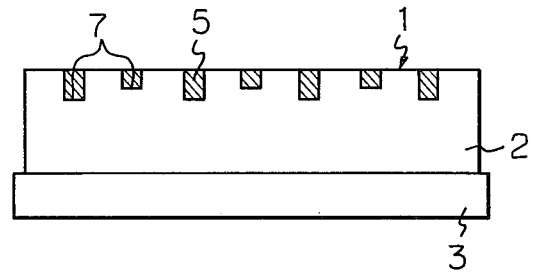
FIG. 3 is a sectional view showing a further embodiment of the invention.

In FIGS. 1 through 3, illustrated at 1 are friction pads, according to the invention, and the pads 1 consist respectively of linings 2 of a conventional sintered metal and backing plates 3. In the embodiment of FIG. 1, a plurality of recesses 4 is formed in the working surface or the upper surface of the lining 2, and each recess 4 is filled with a resin material 5 with the upper surface of the material 5 flush with the surface of the lining 2. In the embodiment, each recess 4 an inwardly tapering conical shape. However the recesses 4 may be a plurality of grooves extending in either the radial or circumferential direction with respect to the disc and being spaced from one another. Preferably, the upper surfaces of the material 5 in the recesses 4 constitutes about half of the total area of the working surface of the friction pad at the time of the initial construction, although the ratio between the area of the surface of the resin material 5 and the area of the sintered metal as illustrated in FIG. 1 is less than 1:1.

FIG. 2 shows a second embodiment of the invention, wherein a plurality of relatively shallow recesses 6 is formed in the top surface of the friction pad 1 nd which are filled with resin material 5. Similar to the first embodiment, the configuration and arrangement of the recesses 6 as viewed from the top may be determined as desired.

FIG. 3 shows a third embodiment of the invention, wherein a plurality of relatively shallow recesses and a plurality of relatively deep recesses are formed in the friction pad 1, and are filled with resin material 5.

Figure 4:
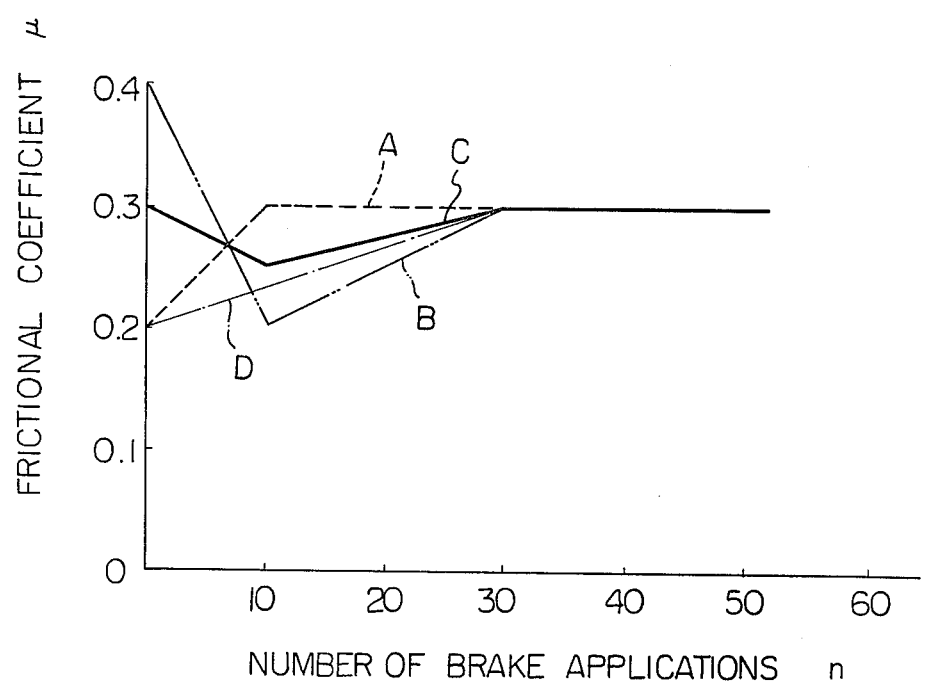
FIG. 4 is a graph showing the change in the frictional coefficient of various friction pads in relation to the number of brake applications.

FIG. 4 is a graph showing the relationship between the frictional coefficient of the friction pad and the number of brake applications. The curve A is for a friction pad formed of sintered metal with grooves formed therein. The curve B is for a friction pad formed of sintered metal with resin material coated thereon. The curve D is for a conventional friction pad formed of sintered metal without any grooves. And the curve C is for a friction pad according to the invention.

The curve A, which is based on experimental data, shows that for a sintered metal friction pad having a plurality of empty grooves in the top or the working surface thereof, i.e. grooves which are not filled with resin, the frictional coefficient in the initial stage is very low, but it rapidly increases with the number of brake applications. The curve B shows that when a resin material is coated on the entire surface of a sintered metal friction pad which has no recesses formed therein, the frictional coefficient is very high and it decreases rapidly in the initial stage and thereafter increases, thus causing problems of a change in the frictional coefficient. The curve D shows the characteristics of conventional sintered metal friction pads which have not been subjected to any particular machining or coating operations, and the frictional coefficient is very low in the initial stage and does not increase very rapidly with the number of brake applications.

The curve C shows the characteristics of the friction pad according to the invention, from which it can be seen that the frictional coefficient is neither low nor high in the initial stage of operation and also that the change thereof with the number of brake applications is relatively small.

As described hereinbefore, the friction pad according to the invention has at least one recess in the working surface of the lining or the surface which is adapted to engage with the disc, and the recess is filled with resin so that the surface of the resin is flush with the surface of the lining. With this construction it is possible to solve the problem of the conventional sintered metal friction pad that during the initial stage of usage, the braking operation is not effectively performed.

What is claimed is:

1. A friction pad for use in disc brakes, said friction pad being made of a sintered metal and having a working surface for contacting a disc and further having a plurality of shallow recesses in said working surface, and a resin filling said recesses.

2. A friction pad as claimed in claim 1 wherein said recesses extend in the direction of the thickness of the friction pad a distance not exceeding half the thickness of the sintered metal.

3. A friction pad as claimed in claim 1 wherein the surface of the resin is flush with the working surface of the friction pad.

4. A friction pad as claimed in claim 1 wherein the total area of the exposed surface of the resin at the time of the initial use of the friction pad is about half of the area of said working surface.

5. A friction pad as claimed in claim 1 wherein each recess has a cone-like shape with the apex thereof away from the working surface in the direction of the thickness of the friction pad.

* * * * *